(12) United States Patent
Tachibana

(10) Patent No.: US 8,805,569 B2
(45) Date of Patent: Aug. 12, 2014

(54) CONTROLLER AND CONTROLLER OF ROLLING MILL

(75) Inventor: Minoru Tachibana, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 396 days.

(21) Appl. No.: 13/390,126

(22) PCT Filed: Sep. 16, 2009

(86) PCT No.: PCT/JP2009/066127
§ 371 (c)(1),
(2), (4) Date: Feb. 13, 2012

(87) PCT Pub. No.: WO2011/033615
PCT Pub. Date: Mar. 24, 2011

(65) Prior Publication Data
US 2012/0173025 A1 Jul. 5, 2012

(51) Int. Cl.
| | | |
|---|---|---|
| G06F 19/00 | (2011.01) | |
| G05B 19/416 | (2006.01) | |
| G05B 7/02 | (2006.01) | |
| B21B 37/50 | (2006.01) | |

(52) U.S. Cl.
CPC . *G05B 7/02* (2013.01); *B21B 37/50* (2013.01); *G05B 19/416* (2013.01); *G05B 2219/41131* (2013.01)
USPC ........... 700/148; 700/117; 700/145; 700/150; 700/151; 700/152; 700/153; 700/154; 700/155

(58) Field of Classification Search
CPC .......... B21B 37/48; B21B 37/50; B21B 37/52
USPC ......... 700/117, 145, 148, 150, 151, 152, 153, 700/154, 155
See application file for complete search history.

(56) References Cited

U.S. PATENT DOCUMENTS 3,318,125 A * 5/1967 Pullen ............................ 72/11.5
3,702,071 A * 11/1972 Masar .............................. 72/9.4
(Continued)

FOREIGN PATENT DOCUMENTS

| CN | 101073987 A | 11/2007 |
| JP | 9-52107 A | 2/1997 |
| JP | 2008-30077 A | 2/2008 |

OTHER PUBLICATIONS

The International Bureau of WIPO, English translation of International Preliminary Report on Patentability in International Patent Application PCT/JP2009/066127, (Apr. 11, 2012).

*Primary Examiner* — Ronald Hartman, Jr.
(74) *Attorney, Agent, or Firm* — Leydig, Voit & Mayer, Ltd.

(57) ABSTRACT

A controller restraining overcorrections which occur upon manual intervention in operation of an equipment controller. The controller includes a driving device which drives equipment to perform mechanical work, a computation element which computes a target value related to an action of the equipment, an automatic controller which outputs an automatic control signal for the driving device based on the target value so that the equipment becomes stable. The controller also includes a manual intervention control unit which outputs a manual correction signal for the driving device in response to a manual intervention. A manual correction unit makes a determination as to whether there is an overcorrection based on the automatic control signal and the manual correction signal, and outputs to the driving device a product obtained by multiplying the manual correction signal output from the manual intervention unit by a prescribed gain regulation value.

12 Claims, 3 Drawing Sheets

(56) References Cited

U.S. PATENT DOCUMENTS

| | | | |
|---|---|---|---|
| 4,061,947 A * | 12/1977 | Vogel | 318/77 |
| 4,236,216 A * | 11/1980 | Anbe | 700/152 |
| 2004/0153196 A1 * | 8/2004 | Park et al. | 700/148 |

* cited by examiner

CONTROLLER AND CONTROLLER OF ROLLING MILL

TECHNICAL FIELD

The present invention relates to a controller which performs automatic control of prescribed equipment and can perform manual corrections of actions of the above-described equipment when necessary.

BACKGROUND ART

In automatic control of prescribed equipment, an automatic control signal is outputted on the basis of, for example, a target value (a command value) and a detected value so that actions of the above-described equipment become stable in a desired condition, whereby a driving device is controlled.

Some apparatuses which perform such automatic control are provided with a manual intervention unit operated by humans, whereby actions of the above-described equipment can be manually regulated. In such controllers, in the case where an action of equipment has deviated abruptly from a target value due to, for example, a disturbance or the like, an operator operates a manual intervention unit, whereby a manual control signal is outputted and the action of the equipment is manually corrected.

As a conventional art of controllers having such functions, there have been proposed controllers for performing speed control of the rolls of a rolling mill stand which are configured to be capable of manually regulating the speed of the rolls (refer to Patent Literature 1, for example).

PATENT LITERATURE

Patent Literature 1: Japanese Patent Laid-Open No. H9-52107

SUMMARY OF INVENTION

Technical Problem

In an apparatus which performs automatic control, a driving device which drives equipment is controlled constantly (at prescribed intervals) by an automatic control signal. In a controller provided with a manual intervention unit, in general, priority is given to manual control. Therefore, when a manual correction signal is outputted as a signal having the same polarity as an automatic control signal, equipment operates in such a manner as to deviate from a target value, i.e., an overcorrection occurs, posing the problem that the equipment might not be capable of being controlled in a stable manner. In particular, in automatic control, when an action of the equipment deviates abruptly from a target value, the response is often made fast by increasing a control gain. In such cases, an automatic control signal and a manual correction signal overlap, posing the problem that a control system is liable to become unstable.

Such problems can occur also in the controller of a rolling mill described in Patent Literature 1. Incidentally, when an overcorrection due to manual intervention occurs in the control of a rolling mill, an excessive loop and an overtension of a rolled material occur between rolling mill stands and appropriate threading becomes difficult, posing the problem that the suspension of operations is unavoidable. Also, even when the suspension of operations is not unavoidable, this poses the problem that the quality of products deteriorates greatly, for example, the plate thickness and plate width of a rolled material becomes nonuniform and flaws are formed on the surface of a rolled material.

The present invention was made to solve the problems as described above, and an object of the invention is to provide a controller and a controller of rolling mill capable of restraining the occurrence of overcorrections which might occur when the action control of equipment is subjected to manual intervention, and stably controlling actions of the equipment in a desired condition.

Solution of Problem

A controller of the invention is a controller which comprises a driving device which drives prescribed equipment and causes the equipment to perform mechanical work, a computation element which computes a target value related to an action of the equipment, an automatic controller which outputs an automatic control signal for the driving device on the basis of a target value computed by the computation element so that the action of the equipment becomes stable in a desired condition, a manual intervention unit which is operated in manually correcting the action of the equipment, a manual intervention control unit which outputs a manual correction signal for the driving device in response to an operation performed for the manual intervention unit, and a manual correction unit which makes a determination as to whether or not there is an overcorrection due to a manual operation on the basis of an automatic control signal outputted from the automatic controller and a manual correction signal outputted from the manual intervention control unit, and outputs to the driving device a product obtained by multiplying a manual correction signal outputted from the manual intervention control unit by a prescribed gain regulation value.

A controller of a rolling mill of the invention is a controller of a rolling mill which comprises a plurality of rolling mill stands and a looper provided between the rolling mill stands which are adjacent to each other and performs the height control of the looper and the speed control of a roll-driving motor of the rolling mill stand provided on the upstream side of the looper, thereby performing the tension control of a rolled material which passes the upstream side rolling mill stand. The controller comprises a tension control unit which outputs a tension control signal on the basis of a deviation of a detected value from a command value for the tension of the rolled material, a looper height control unit which outputs a looper height control signal on the basis of a deviation of a detected value from a command value for the prescribed looper height, an automatic control unit which outputs an automatic control signal for the roll-driving motor on the basis of a speed command signal for the roll-driving motor, a tension control signal outputted from the tension control unit and a looper height control signal outputted from the looper height control unit so that the speed of the roll-driving motor becomes stable in a desired condition, a manual intervention unit which is operated in manually correcting the speed of the roll-driving motor, a speed correction unit which outputs a speed correction signal for the roll-driving motor in response to an operation performed for the manual intervention unit, and a manual correction amount regulator which makes a determination as to whether or not there is an overcorrection due to a manual operation on the basis of an automatic control signal outputted from the automatic control unit and a speed correction signal outputted from the speed correction unit, and outputs to the roll-driving motor a product obtained by multiplying a speed correction signal outputted from the speed correction unit by a prescribed gain regulation value.

Also, a controller of a rolling mill of the invention is a controller of a rolling mill which comprises a plurality of rolling mill stands and a looper provided between the rolling mill stands which are adjacent to each other and performs the height control of the looper and the speed control of a roll-driving motor of the rolling mill stand provided on the upstream side of the looper, thereby performing the tension control of a rolled material which passes the upstream side rolling mill stand. The controller comprises a load detector which detects loads acting on rolls of the upstream side rolling mill stands, a torque detector which detects torques of the roll-driving motor, an acceleration detector which detects the acceleration of the roll-driving motor, a tension detector which detects the tension of the rolled material on the basis of detection results of the load detector, the torque detector and the acceleration detector, a tension control unit which outputs a tension control signal on the basis of a deviation of a detected value of the tension detector from a prescribed tension command value, a looper height detector which detects the height of the looper, a looper height control unit which outputs a looper height control signal on the basis of a deviation of a detected value of the looper height detector from a prescribed looper height command value, an automatic control unit which outputs an automatic control signal for the roll-driving motor on the basis of a speed command signal for the roll-driving motor, a tension control signal outputted from the tension control unit and a looper height control signal outputted from the looper height control unit so that the speed of the roll-driving motor becomes stable in a desired condition, a manual intervention unit which is operated in manually correcting the speed of the roll-driving motor, a speed correction unit which outputs a speed correction signal for the roll-driving motor in response to an operation performed for the manual intervention unit, and a manual correction amount regulator which makes a determination as to whether or not there is an overcorrection due to a manual operation on the basis of an automatic control signal outputted from the automatic control unit and a speed correction signal outputted from the speed correction unit, and outputs to the roll-driving motor a product obtained by multiplying a speed correction signal outputted from the speed correction unit by a prescribed gain regulation value.

Advantageous Effects of Invention

According to the present invention, it becomes possible to restrain the occurrence of overcorrections which might occur when the action control of equipment is subjected to manual intervention, and to stably control the action of the equipment in a desired condition.

DESCRIPTION OF EMBODIMENTS

The present invention will be described in more detail with reference to the accompanying drawings. Incidentally, in each of the drawings, like numerals refer to like or similar parts and redundant descriptions of these parts are appropriately simplified or omitted.

First Embodiment

Figure 1:
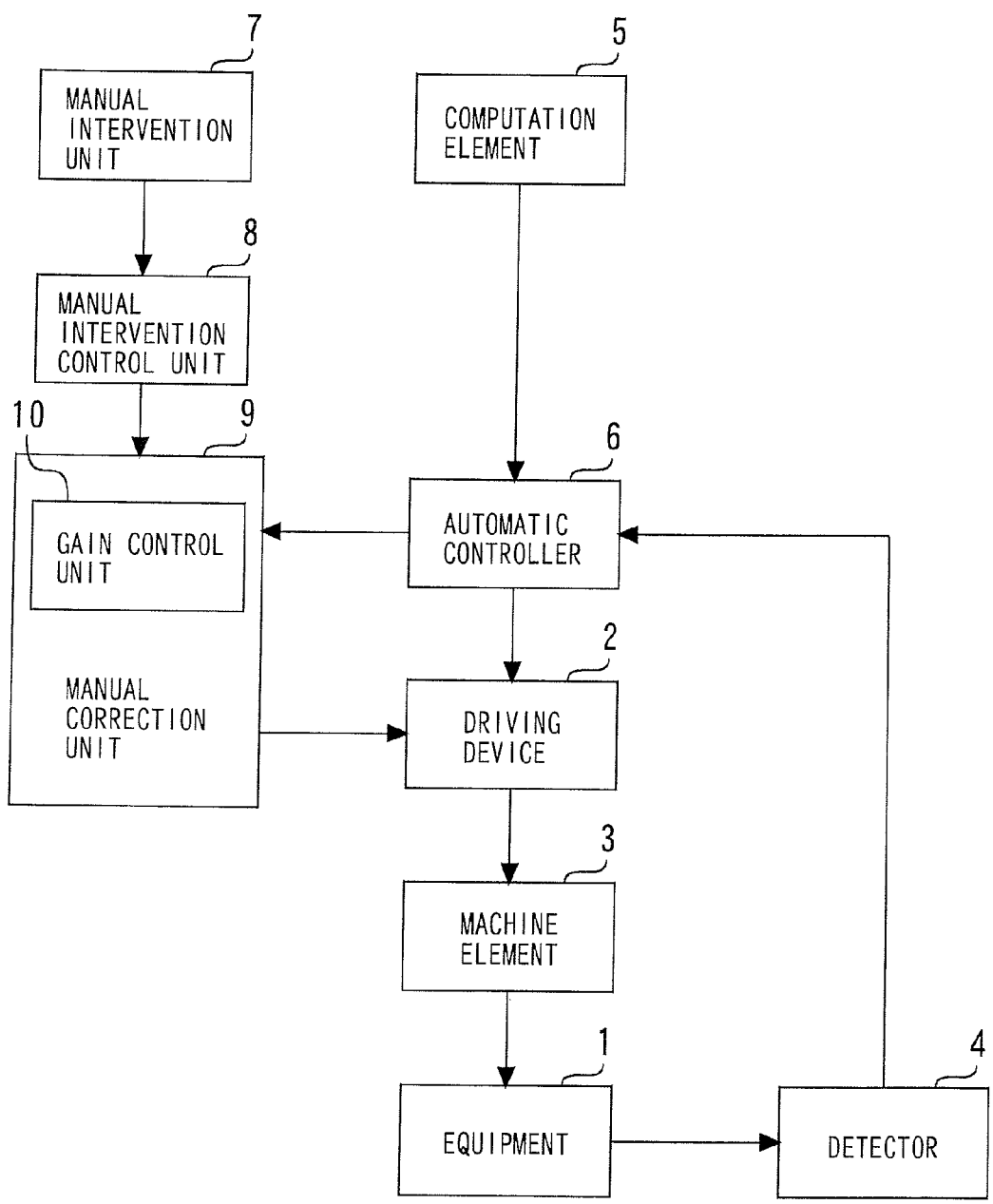
FIG. 1 is a block diagram showing a controller in a first embodiment according to the present invention.

FIG. 1 is a block diagram showing a controller in a first embodiment according to the present invention.

In FIG. 1, reference numeral 1 denotes equipment which performs prescribed mechanical work. This equipment 1 is driven by a driving device 2. Reference numeral 3 denotes a machine element which converts the driving force of the driving device 2 into the above-described prescribed mechanical work in order to cause the equipment 1 to perform a prescribed action, reference numeral 4 denotes a detector which detects prescribed physical quantities (for example, speed or the like) related to the equipment 1, and reference numeral 5 is a computation element which obtains a prescribed target value related to the action of the equipment 1 by computation according to the situation and the like. It is necessary only that the detector 4 be capable of detecting the above-described physical quantities directly or indirectly, and the object of the detection may be the driving device 2, the mechanical element 3 or other elements instead of the equipment 1.

Reference numeral 6 denotes an automatic controller for performing the automatic control of the driving device 2. This automatic controller 6 outputs an automatic control signal to the driving device 2 on the basis of a target value computed by the computation element 5 and a detected value detected by the detector 4 so that the action of the equipment 1 becomes stable in a desired condition. For example, by computing a deviation of the detected value from the target value, the automatic controller 6 controls the driving device 2 so that the action of the equipment 1 conforms to the above-described target value. While automatic control is being performed, the driving device 2 responds to an automatic control signal which is inputted, and causes the equipment 1 to perform mechanical work.

Reference numeral 7 denotes a manual intervention unit which is operated in manually correcting the action of the equipment 1. That is, the controller of this embodiment has the function of manually regulating the action of the equipment 1. For example, when the action of the equipment 1 has deviated abruptly from a target value due to disturbance or the like, an operator or other people operate the manual intervention unit 7 at that point of time when the operator recognized the phenomenon, and manually corrects the action of the equipment 1.

Reference numeral 8 denotes a manual intervention control unit which converts the manual operation performed by the operator or other people into a control signal for the driving device 2. That is, the manual intervention control unit 8 outputs a manual correction signal for the driving device 2 in response to the operation performed for the manual intervention unit 7.

Reference numeral 9 denotes a manual correction unit which performs the gain regulation of a manual correction signal and outputs a signal of the regulation to the driving device 2. This manual correction unit 9 has the function of making a determination as to whether or not the manual correction by the manual intervention unit 7 can be an overcorrection, and the function of setting a gain regulation value by which a manual correction signal is multiplied on the basis of the determination result and outputting the signal obtained by multiplication to the driving device 2. Each of the above-described functions is realized by a gain control unit 10 provided in the manual correction unit 9.

Figure 2:
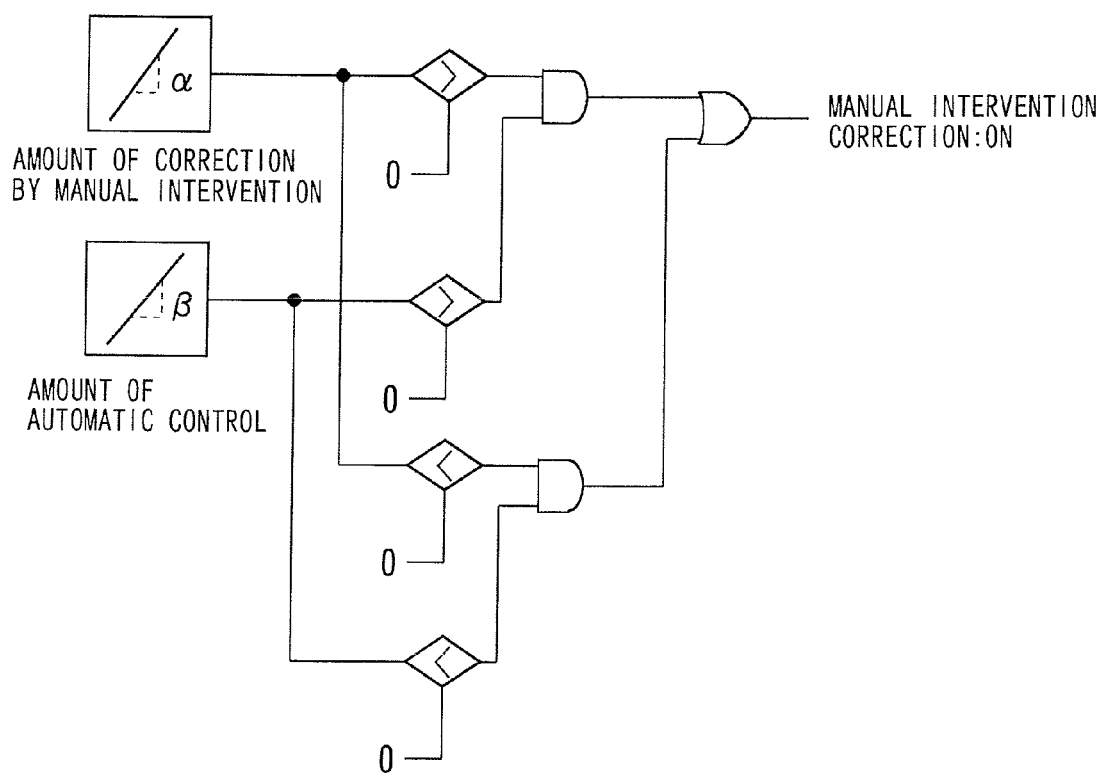
FIG. 2 is a diagram to explain the action of a manual correction unit shown in FIG. 1.
Figure 3:
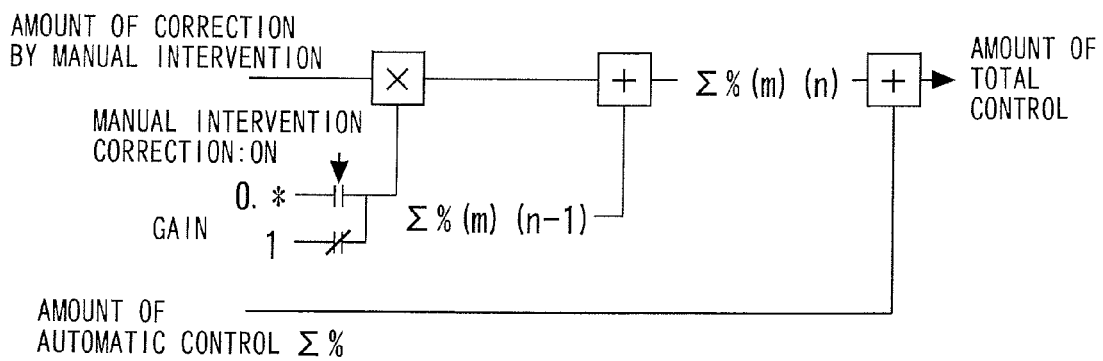
FIG. 3 is a diagram to explain the action of the manual correction unit shown in FIG. 1.

Referring to also FIGS. 2 and 3, the concrete configuration and function of the above-described manual correction unit 9 (the gain control unit 10) will be described below. FIGS. 2 and 3 are diagrams to explain the action of the manual correction unit shown in FIG. 1.

Upon input of a manual correction signal from the manual intervention control unit 8, the gain control unit 10 makes a determination as to whether or not there is a possibility of an overcorrection due to manual intervention on the basis of the manual correction signal and an automatic control signal outputted at that time from the automatic controller 6. Then, the gain control unit 10 determines a gain regulation value on the basis of the above-described determination result, and outputs a product obtained by multiplying the gain regulation value by a manual correction signal inputted from the manual intervention control unit 8.

The above-described determination as to whether or not there is an overcorrection is made, for example, according to whether or not an automatic control signal and a manual correction signal have the same polarity, that is, whether or not the control direction of the driving device 2 by an automatic control signal and the control direction of the driving device 2 by a manual correction signal are the same. For example, upon input of a manual correction signal from the manual intervention control unit 8, the gain control unit 10 obtains an automatic control signal at that time from the automatic controller 6, and makes a determination as to whether or not the output direction $\Delta\alpha$ of a manual correction signal $\Delta V\text{man}$ and the output direction $\Delta\beta$ of an automatic control signal $\Delta V\_\text{cnt}$ have the same polarity.

If the following formula holds, $$\text{AVEman} = \{\Sigma \Delta V\text{man}[n-(m-1)]\}/4[m=1-4] \quad (1),$$

then the above-described output direction $\Delta\alpha$ is expressed by the following formula:

$$\Delta\alpha = [(\Delta V\text{man}(n)-\text{AVE})*1.5 + (\Delta V\text{man}(n-1)-\text{AVE})* \\ 0.5 + (\Delta V\text{man}(n-2)-\text{AVE})*(-1.5) + (\Delta V\text{man}(n-3)- \\ \text{AVE})*(-0.5)]/5 \quad (2)$$

If the following formula holds, $$\text{AVE}\_\text{cnt} = \{\Sigma \Delta V\_\text{cnt}[n-(m-1)]\}/4[m=1-4] \quad (3),$$

then the above-described output direction $\Delta\beta$ is expressed by the following formula:

$$\Delta\beta = [(\Delta V\_\text{cnt}(n)-\text{AVE})*1.5 + (\Delta V\_\text{cnt}(n-1)-\text{AVE})* \\ 0.5 + (\Delta V\_\text{cnt}(n-2)-\text{AVE})*(-1.5) + (\Delta V\_\text{cnt}(n-3)- \\ \text{AVE})*(-0.5)]/5 \quad (4)$$

Hence, the gain control unit 10 calculates $\Delta\alpha$ and $\Delta\beta$ by the above-described formulae, and makes a comparison as to whether the polarity of $\Delta\alpha$ and the polarity of $\Delta\beta$ are the same. When the polarity of $\Delta\alpha$ and the polarity of $\Delta\beta$ are the same, the gain control unit 10 determines that an overcorrection can occur, and performs gain regulation so that the amount of correction by manual intervention is reduced.

That is, when Formula (5) or (6) below holds, a product obtained by multiplying a manual correction signal by a prescribed value which is less than 1 (for example, 0.8) is outputted to the driving device 2:

$$\Delta\alpha > 0 \text{ and } \Delta\beta > 0 \quad (5)$$

$$\Delta\alpha < 0 \text{ and } \Delta\beta < 0 \quad (6)$$

On the other hand, when the polarity of $\Delta\alpha$ and the polarity of $\Delta\beta$ are different, the control direction by an automatic control signal and the control direction by a manual correction signal are different and hence it can be determined that there is no possibility of an overcorrection. That is, when neither Formula (5) nor Formula (6) above holds, the gain control unit 10 outputs a manual correction signal outputted from the manual intervention control unit 8 just as it is to the driving device 2, and causes the manual operation of the operator or other people to be reflected just as it is in the action of the equipment 1.

When the polarity of $\Delta\alpha$ and the polarity of $\Delta\beta$ are different, a manual correction signal outputted from the manual intervention control unit 8 may be inputted to the driving device 2 just as it is without the gain regulation by the gain control unit 10. Also, as shown in FIG. 3, irrespective of the polarity of $\Delta\alpha$ and $\alpha\beta$, it is possible to constantly perform gain regulation for a manual correction signal outputted from the manual intervention control unit 8 and, in the case of a difference in the polarity of $\Delta\alpha$ and $\Delta\beta$, it is possible to output to the driving device 2 a product obtained by multiplying a manual correction signal by a prescribed value (for example, 1) which is larger than a gain regulation value used in the case of the same polarity.

Incidentally, FIG. 3 shows as an example the case where a signal obtained by adding an automatic control signal from the automatic controller 6 and a manual correction signal from the manual correction unit 9 (a signal after gain regulation) is outputted to the driving device 2 as the total controlled variable.

Figure 4:
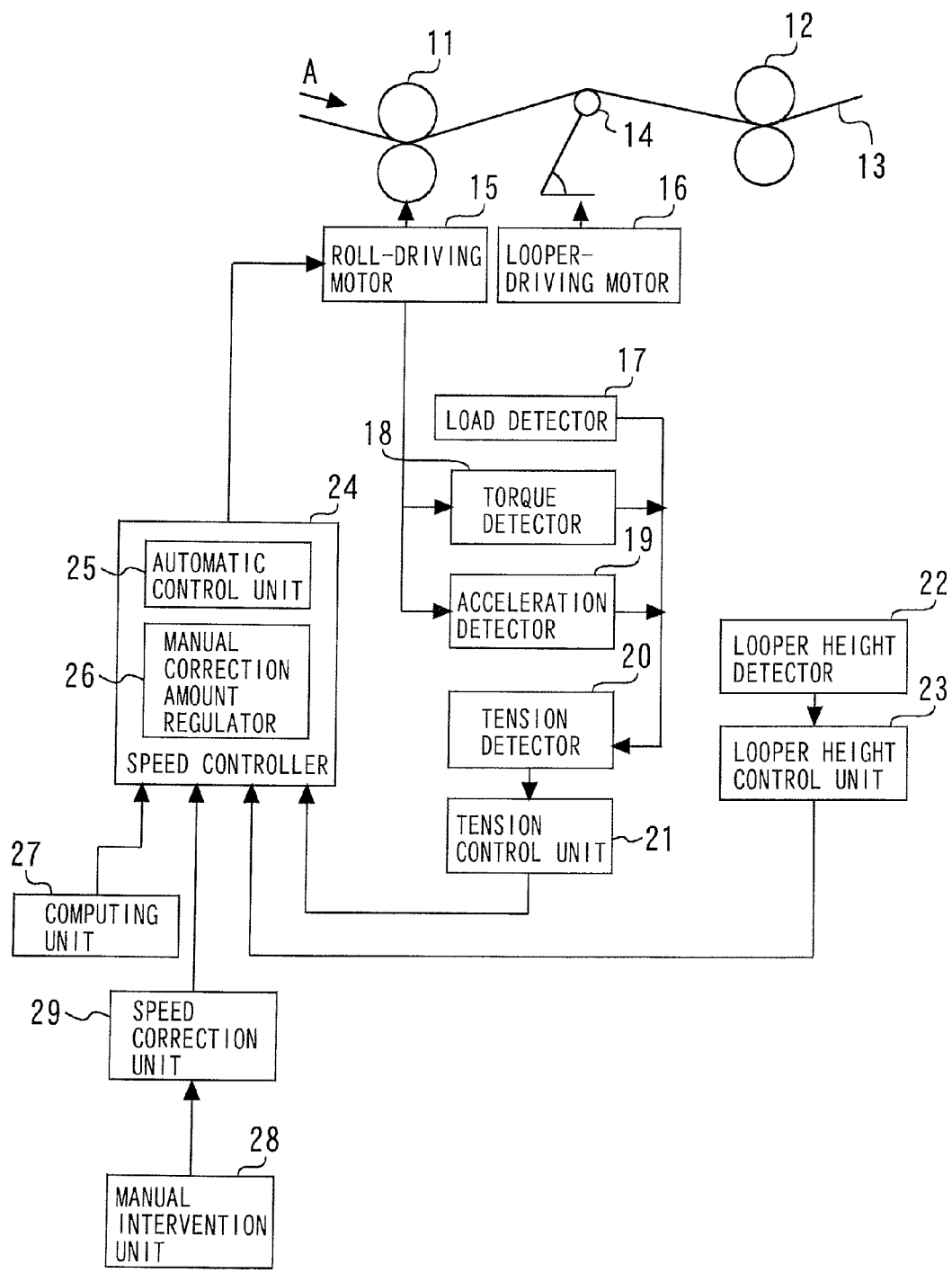
FIG. 4 is a block diagram showing a controller of a rolling mill in the first embodiment according to the present invention.

Next, referring to also FIG. 4, an example in which the controller of the above-described configuration is applied to a control system of a rolling mill will be described specifically. FIG. 4 is a block diagram showing the controller of a rolling mill in the first embodiment according to the present invention.

In FIG. 4, reference numerals 11 and 12 denote rolling mill rolls which roll a material to be rolled 13 (hereinafter also referred to simply as "rolls"), reference numeral 14 denotes a looper for controlling the tension of the rolled material 13 between the rolls 11 and 12, reference numeral 15 denotes a roll-driving motor which rotationally drives the rolls 11, and reference numeral 16 denotes a looper-driving motor which drives the looper 14. The arrow A denotes the moving direction of the rolled material 13. That is, the roll-driving motor 15 drives the rolls 11 of the rolling mill stand provided on the upstream side of the looper 14.

The controller shown in FIG. 4 performs the tension control of the rolled material 13 which passes through the rolls 11, i.e., passes through the rolling mill stand on the upstream side of the looper 14 by performing the height control of the looper 14 and the speed control of the roll-driving motor 15.

In a continuous rolling mill, a plurality of rolling mill stands are installed and a looper is provided between rolling mill stands which are adjacent to each other. The same control is performed for the looper and the rolling mill stands on the upstream side of the looper. FIG. 4 shows only two adjacent rolling mill stands in such a continuous rolling mill.

Reference numeral 17 denotes a load detector, which detects the load acting on the rolls 11. Reference numeral 18 denotes a torque detector, which detects the torque of the roll-driving motor 15. Reference numeral 19 denotes an acceleration detector, which detects the acceleration of the roll-driving motor 15. Each of the detectors 17 to 19 may be formed of any means so long as it has the function described above, respectively.

Reference numeral 20 denotes a tension detector, which has the function of detecting the tension of the rolled material 13 from the detection results of the detectors 17 to 19. Specifically, the tension detector 20 detects the tension of the rolled material 13 passing through the rolls 11 on the basis of each of the actual values of the load detected by the load detector 17, the torque detected by the torque detector 18, and the acceleration detected by the acceleration detector 19. Reference numeral 21 denotes a tension control unit which outputs a tension control signal. This tension control unit 21 outputs a tension control signal as a returned signal by computing, for example, a deviation of a detected value of tension by the tension detector 20 from a command value of tension for the rolled material 13 found by a prescribed computation and the like.

Reference numeral 22 denotes a looper height detector which detects the height of the looper 14, and reference numeral 23 denotes a looper height control unit which outputs a looper height control signal. The looper height control unit 23 outputs a looper height control signal as a returned signal by computing, for example, a deviation of a detected value of looper height by the looper height detector 22 from a command value of height for the looper 14 found by a prescribed computation and the like.

Reference numeral 24 denotes a speed controller which performs the speed control of the roll-driving motor 15. This speed controller 24 is provided with an automatic control unit 25 having the function of automatic control and a manual correction amount regulator 26 having the function of correction during manual intervention. On the basis of a target value for the speed of the roll-driving motor 15 and detected values of each of the detectors, the automatic control unit 25 outputs an automatic control signal to the roll-driving motor 15 so that the speed of the roll-driving motor 15 becomes stable in a desired condition. Specifically, the automatic control unit 25 obtains the above-described automatic control signal by adding a tension control signal from the tension control unit 21 and a loop height control signal from the looper height control unit 23 to a speed command signal computed by a prescribed computing unit 27 as the above-described target value. While automatic control is being performed, the roll-driving motor 15 drives the rolls 11 in response to an automatic control signal which is inputted, and maintains the tension of the rolled material 13 in an appropriate condition.

Reference numeral 28 denotes a manual intervention unit operated in manually correcting the rolling speed of the rolls 11, i.e., the speed of the roll-driving motor 15. This manual intervention unit 28 is operated by, for example, an operator or the like who visually monitors the operating condition of a rolling mill. Reference numeral 29 denotes a speed correction unit which converts a manual operation performed by an operator or the like into a control signal for the roll-driving motor 15. That is, the speed correction unit 29 outputs a speed correction signal for the roll-driving motor 15 in response to an operation performed for the manual intervention unit 28.

The manual correction amount regulator 26 in the speed controller 24 has the function of performing gain regulation for the above-described speed correction signal and outputting a signal of the regulation to the roll-driving motor 15. Specifically, the manual correction amount regulator 26 has the function of making a determination as to whether or not a manual correction by the manual intervention unit 28 can become an overcorrection, and the function of setting a gain regulation value by which a speed correction signal is multiplied on the basis of the determination result and outputting the signal obtained by multiplication to the roll-driving motor 15. Concrete functions of the manual correction amount regulator 26 will be described below with reference to also FIGS. 2 and 3.

Upon input of a speed correction signal from the speed correction unit 29, the manual correction amount regulator 26 makes a determination as to whether or not there is a possibility of an overcorrection due to manual intervention on the basis of the speed correction signal and an automatic control signal outputted at that time from the automatic control unit 25. Then, the manual correction amount regulator 26 determines a gain regulation value on the basis of the above-described determination result, and outputs to the roll-driving motor 15 a product obtained by multiplying the gain regulation value by a speed correction signal inputted from the speed correction unit 29.

The above-described determination as to whether or not there is an overcorrection is made, for example, according to whether or not an automatic control signal and a speed correction signal have the same polarity, that is, whether or not the control direction for the roll-driving motor 15 is the same for an automatic control signal and a speed correction signal. For example, upon input of a speed correction signal from the speed correction unit 29, the manual correction amount regulator 26 obtains an automatic control signal at that time from the automatic control unit 25, and makes a determination as to whether or not the output direction $\Delta\alpha$ of the speed correction signal $\Delta V$man and the output direction $\Delta\gamma$ of the automatic control signal $\Delta V\_1p$ (corresponding to the above-described $\Delta\beta$) have the same polarity.

The output direction $\Delta\alpha$ of the speed correction signal $\Delta V$man is expressed by Formulas (1) and (2) above.

If the following formula holds, $$\text{AVE}\_1p = \{\Sigma \Delta V\_1p[n-(m-1)]\}/4[m=1-4] \qquad (7),$$

then the above-described output direction $\Delta\gamma$ is expressed by the following formula:

$$\Delta\gamma = [(\Delta V\_1p(n)-\text{AVE})*1.5+(\Delta V\_1p(n-1)-\text{AVE})* \\ 0.5+(\Delta V\_1p(n-2)-\text{AVE})*(-1.5)+(\Delta V\_1p(n-3)-\text{AVE})*(-0.5)]/5 \qquad (8)$$

Hence the manual correction amount regulator 26 calculates $\Delta\alpha$ and $\Delta\gamma$ by the above-described formulae, and makes a comparison as to whether the polarity of $\Delta\alpha$ and the polarity of $\Delta\gamma$ are the same. When the polarity of $\Delta\alpha$ and the polarity of $\Delta\gamma$ are the same, the manual correction amount regulator 26 determines that an overcorrection can occur, and performs gain regulation so that the amount of correction by manual intervention is reduced.

That is, when Formula (9) or (10) below holds, a product obtained by multiplying a speed correction signal by a prescribed value which is less than 1 (for example, 0.8) is outputted to the roll-driving motor 15:

$$\Delta\alpha > 0 \text{ and } \Delta\gamma > 0 \qquad (9)$$

$$\Delta\alpha < 0 \text{ and } \Delta\gamma < 0 \qquad (10)$$

On the other hand, when the polarity of $\Delta\alpha$ and the polarity of $\Delta\gamma$ are different, the control direction by an automatic control signal and the control direction by a speed correction signal are different and hence it can be determined that there is no possibility of an overcorrection. That is, when neither Formula (9) nor Formula (10) above holds, the manual correction amount regulator 26 outputs a speed correction signal outputted from the speed correction unit 29 just as it is to the roll-driving motor 15, and causes the manual operation of the operator or other people to be reflected in the speed of the rolls 11 just as it is.

When the polarity of $\Delta\alpha$ and the polarity of $\Delta\gamma$ are different, a speed correction signal outputted from the speed correction unit 29 may be inputted to the roll-driving motor 15 just as it is without the gain regulation by the manual correction amount regulator 26. Also, as shown in FIG. 3, irrespective of the polarity of $\Delta\alpha$ and $\Delta\gamma$, it is possible to constantly perform gain regulation for a speed correction signal outputted from the speed correction unit 29 and, in the case of a difference in the polarity of Δα and Δγ, it is possible to output to the roll-driving motor 15 a product obtained by multiplying a speed correction signal by a prescribed value (for example, 1) which is larger than a gain regulation value used in the case of the same polarity.

According to the first embodiment of the present invention, even when the action control of the equipment 1 is subjected to manual intervention, it becomes possible to suppress the occurrence of an overcorrection by the manual intervention and to stably control the action of the equipment 1 in a desired condition.

In the case where the present invention is applied to the controller of a rolling mill, even when the speed control of the roll-driving motor 15 is subjected to the manual intervention of an operator, it is possible to prevent an overcorrection due to this manual intervention, enabling the speed imbalance between rolling mill stands to be avoided. That is, in the rolling mill, the threadability of the rolled material 13 is improved, enabling product quality to be improved greatly.

INDUSTRIAL APPLICABILITY

The controller of the present invention can be applied to a device which performs the automatic control of the action of equipment and can manually regulate the action of the above-described equipment.

REFERENCE SIGNS LIST 1 equipment
2 driving device
3 machine element
4 detector
5 computation element
6 automatic controller
7 manual intervention unit
8 manual intervention control unit
9 manual correction unit
10 gain control unit
11, 12 rolling mill roll
13 rolled material
14 looper
15 roll-driving motor
16 looper-driving motor
17 load detector
18 torque detector
19 acceleration detector
20 tension detector
21 tension control unit
22 looper height detector
23 looper height control unit
24 speed controller
25 automatic control unit
26 manual correction amount regulator
27 computing unit
28 manual intervention unit
29 speed correction unit

The invention claimed is:

1. A controller comprising:
a driving device which drives equipment and causes the equipment to perform mechanical work;
a computation element which computes a target value related to an action of the equipment;
an automatic controller which outputs an automatic control signal for the driving device based on a target value computed by the computation element so that the action of the equipment becomes stable in a desired condition;
a manual intervention unit which is operated to correct, manually, the action of the equipment;
a manual intervention control unit which outputs a manual correction signal for the driving device in response to an operation performed for the manual intervention unit; and
a manual correction unit which makes a determination as to whether there is an overcorrection due to a manual operation based on an automatic control signal output from the automatic controller and a manual correction signal output from the manual intervention control unit, and outputs, to the driving device, a product obtained by multiplying a manual correction signal output from the manual intervention control unit by a first prescribed gain regulation value.

2. The controller according to claim 1, wherein the manual correction unit
outputs to the driving device the product obtained by multiplying the manual correction signal by the first prescribed gain regulation value when an automatic control signal output from the automatic controller and the manual correction signal output from the manual intervention control unit have the same polarity, and
outputs to the driving device the product obtained by multiplying the manual correction signal by a second prescribed gain regulation value when the automatic control signal and the manual correction signal have different polarities.

3. The controller according to claim 2, wherein
the gain regulation value used when the automatic control signal and the manual correction signal have the same polarity is less than 1, and
the gain regulation value used when the automatic control signal and the manual correction signal have different polarities is 1.

4. The controller according to claim 1, wherein the manual correction unit
outputs to the driving device the product obtained by multiplying the manual correction signal by the first prescribed gain regulation value, which is less than 1, when the automatic control signal output from the automatic controller and the manual correction signal output from the manual intervention control unit have the same polarity, and
outputs to the driving device the manual correction signal output from the manual intervention control unit without change when the automatic control signal and the manual correction signal have different polarities.

5. A controller of a rolling mill which comprises a plurality of rolling mill stands and a looper located between pairs of rolling mill stands which are adjacent to each other and controls height of the looper and speed of a roll-driving motor of the rolling mill stand located on an upstream side of the looper, thereby controlling tension of a rolled material which passes the rolling mill stand on the upstream side, comprising:
a tension control unit which outputs a tension control signal based on deviation of a detected value from a command value for the tensioning of the rolled material;
a looper height control unit which outputs a looper height control signal based on deviation of a detected value from a command value for a prescribed looper height;
an automatic control unit which outputs an automatic control signal for the roll-driving motor based on a speed command signal for the roll-driving motor, a tension control signal output from the tension control unit, and a looper height control signal output from the looper height control unit so that the speed of the roll-driving motor becomes stable in a desired condition;

a manual intervention unit which is operated to control, manually, correction of the speed of the roll-driving motor;

a speed correction unit which outputs a speed correction signal, for the roll-driving motor, in response to an operation performed for the manual intervention unit; and a manual correction amount regulator which makes a determination as to whether there is an overcorrection due to a manual operation based on the automatic control signal output from the automatic control unit and the speed correction signal output from the speed correction unit, and outputs to the roll-driving motor a product obtained by multiplying the speed correction signal output from the speed correction unit by a first prescribed gain regulation value.

6. The controller of a rolling mill according to claim 5, wherein the manual correction amount regulator outputs to the driving device a product obtained by multiplying a manual correction signal by the first prescribed gain regulation value when control direction for the roll-driving motor is the same for the automatic control signal output from the automatic control unit and the speed correction signal output from the speed correction unit, and outputs to the driving device a product obtained by multiplying the manual correction signal by a second prescribed gain regulation value when the control direction for the roll-driving motor is different for each of the automatic control and speed control signals.

7. The controller of a rolling mill according to claim 6, wherein the gain regulation value used when the control direction for the roll-driving motor is the same is less than 1, and the gain regulation value used when the control direction for the roll-driving motor is different is 1.

8. The controller of a rolling mill according to claim 5, wherein the manual correction amount regulator outputs to the driving device a product obtained by multiplying a manual correction signal by the prescribed gain regulation value, which is less than 1 when control direction for the roll-driving motor is the same for the automatic control signal output from the automatic control unit and the speed correction signal output from the speed correction unit, and outputs to the driving device the manual correction signal output from the manual intervention unit without change when the control direction for the roll-driving motor is different for each of the automatic control and speed control signals.

9. A controller of a rolling mill which comprises a plurality of rolling mill stands and a looper located between pairs of rolling mill stands which are adjacent to each other and controls height of the looper and speed of a roll-driving motor of the rolling mill stand located on an upstream side of the looper, thereby controlling tension of a rolled material which passes the rolling mill stand on the upstream side, comprising:

a load detector which detects loads acting on rolls of the rolling mill stands at the upstream side;

a torque detector which detects torques of the roll-driving motor;

an acceleration detector which detects acceleration of the roll-driving motor;

a tension detector which detects the tension of the rolled material based on detection results of the load detector, the torque detector, and the acceleration detector;

a tension control unit which outputs a tension control signal based on deviation of a detected value of the tension detector from a prescribed tension command value;

a looper height detector which detects height of the looper;

a looper height control unit which outputs a looper height control signal based on deviation of a detected value of the looper height detector from a prescribed looper height command value;

an automatic control unit which outputs an automatic control signal for the roll-driving motor based on a speed command signal for the roll-driving motor, a tension control signal output from the tension control unit and a looper height control signal output from the looper height control unit so that the speed of the roll-driving motor becomes stable in a desired condition;

a manual intervention unit which is operated to control, manually, correction of the speed of the roll-driving motor;

a speed correction unit which outputs a speed correction signal, for the roll-driving motor, in response to an operation performed for the manual intervention unit; and a manual correction amount regulator which makes a determination as to whether there is an overcorrection due to a manual operation based on the automatic control signal output from the automatic control unit and the speed correction signal output from the speed correction unit, and outputs to the roll-driving motor a product obtained by multiplying the speed correction signal output from the speed correction unit by a prescribed gain regulation value.

10. The controller of a rolling mill according to claim 9, wherein the manual correction amount regulator outputs to the driving device a product obtained by multiplying a manual correction signal by the first prescribed gain regulation value when control direction for the roll-driving motor is the same for the automatic control signal output from the automatic control unit and the speed correction signal output from the speed correction unit, and outputs to the driving device a product obtained by multiplying the manual correction signal by a second prescribed gain regulation value when the control direction for the roll-driving motor is different for each of the automatic control and speed control signals.

11. The controller of a rolling mill according to claim 10, wherein the gain regulation value used when the control direction for the roll-driving motor is the same is less than 1, and the gain regulation value used when the control direction for the roll-driving motor is different is 1.

12. The controller of a rolling mill according to claim 9, wherein the manual correction amount regulator outputs to the driving device a product obtained by multiplying a manual correction signal by the prescribed gain regulation value, which is less than 1 when control direction for the roll-driving motor is the same for the automatic control signal output from the automatic control unit and the speed correction signal output from the speed correction unit, and outputs to the driving device the manual correction signal output from the manual intervention unit without change when the control direction for the roll-driving motor is different for each of the automatic control and speed control signals.

* * * * *